United States Patent [19]

Olson

[11] 4,407,408
[45] Oct. 4, 1983

[54] FEED CONVEYOR

[76] Inventor: David A. Olson, 1708 Roberts Dr., Albert Lea, Minn. 56007

[21] Appl. No.: 213,420

[22] Filed: Dec. 5, 1980

[51] Int. Cl.³ ............................................ B65G 25/00
[52] U.S. Cl. .................................. 198/621; 119/52 B
[58] Field of Search ...................... 198/621, 745, 747; 222/280, 404; 119/52 B, 56 R

[56] References Cited

U.S. PATENT DOCUMENTS

| | | | |
|---|---|---|---|
| 1,426,039 | 8/1922 | Candee | 198/745 |
| 1,496,089 | 9/1922 | Candee . | |
| 1,543,943 | 6/1925 | Milmoe . | |
| 2,476,723 | 7/1949 | Goldberg . | |
| 2,970,682 | 2/1961 | Fisk | 198/750 |
| 3,006,458 | 10/1961 | Spiazzi . | |
| 3,011,464 | 12/1961 | Danly et al. . | |
| 3,058,361 | 10/1962 | Freeborn . | |
| 3,077,259 | 2/1963 | Braun . | |
| 3,106,523 | 10/1963 | Couture . | |
| 3,486,608 | 12/1969 | Rogers . | |
| 3,529,708 | 9/1970 | Dybala . | |
| 3,561,404 | 2/1971 | Ferris . | |
| 3,581,712 | 6/1971 | Ferris . | |
| 3,586,174 | 6/1971 | Hall . | |
| 3,589,339 | 6/1971 | Schoen . | |
| 3,590,986 | 7/1971 | Andrews et al. . | |
| 3,655,070 | 4/1972 | Haydu | 198/621 |
| 3,688,745 | 9/1972 | Stefan . | |
| 3,759,227 | 9/1973 | Wolfe et al. . | |
| 3,768,632 | 10/1973 | Taniguchi . | |
| 4,032,018 | 6/1977 | Wallis | 198/750 |

Primary Examiner—Joseph E. Valenza
Attorney, Agent, or Firm—Burd, Bartz & Gutenkauf

[57] ABSTRACT

A feed conveyor having reciprocating sidewalls to move the feed along and distribute it about a feed bunk. The conveyor has elongated substantially parallel sidewalls arranged lengthwise of and above the feed bunk. The sidewalls move toward one another to capture feed between them, then move forward to advance the feed along the bunk while holding it by friction. The sidewalls then are moved apart to release the feed and move back to the starting position. One sidewall can be driven while the other trails. The sidewalls can be laterally inclined to form a truncated V-shaped open bottom trough to advance the feed. The sidewalls are connected together by inverted U-shaped pins such that the trailing sidewall follows the driven sidewall.

20 Claims, 9 Drawing Figures

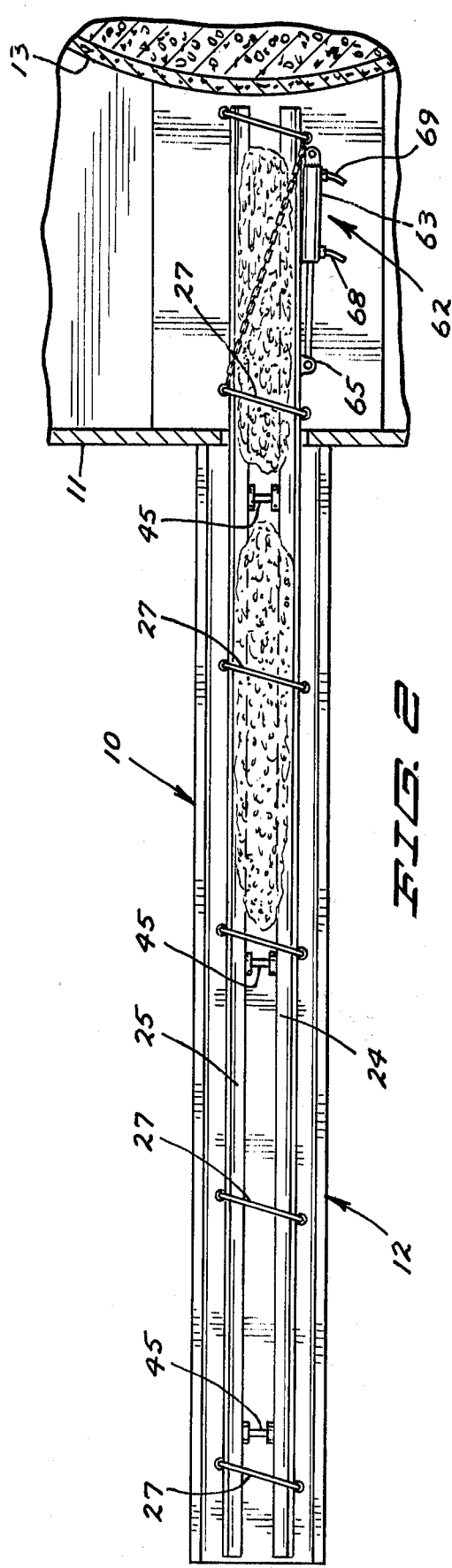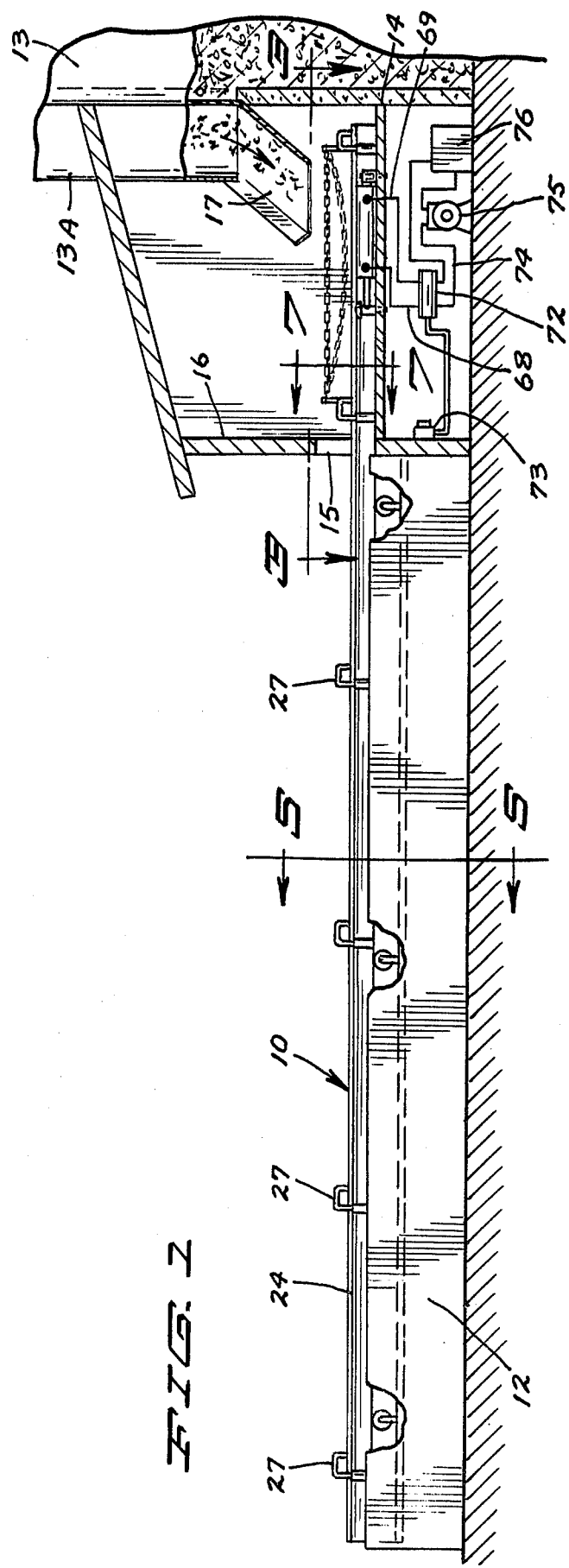

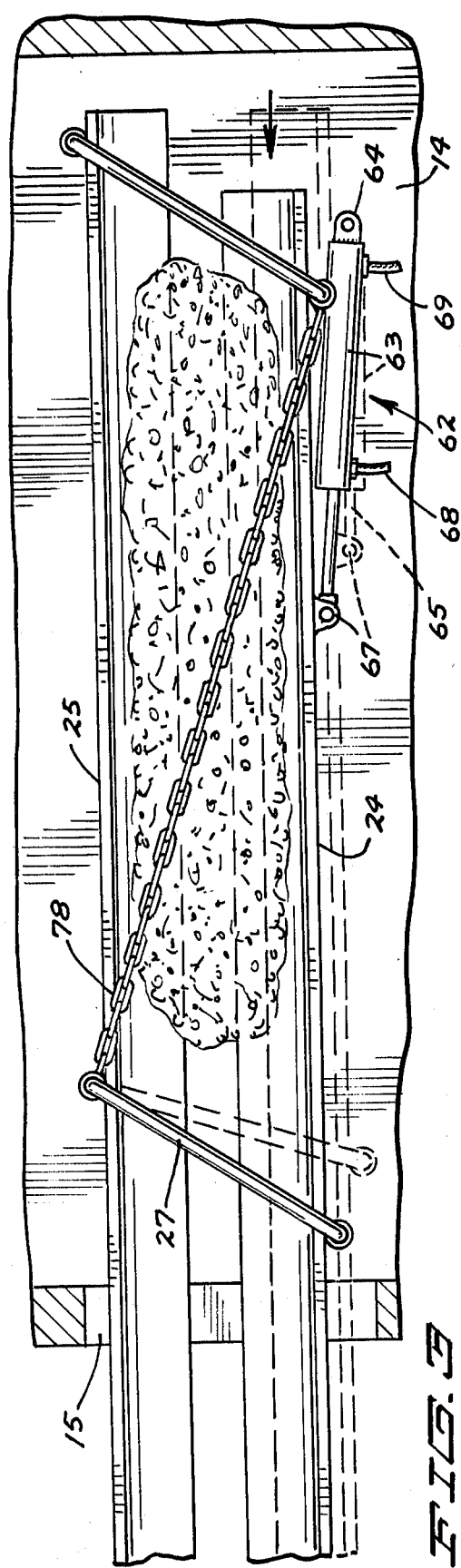
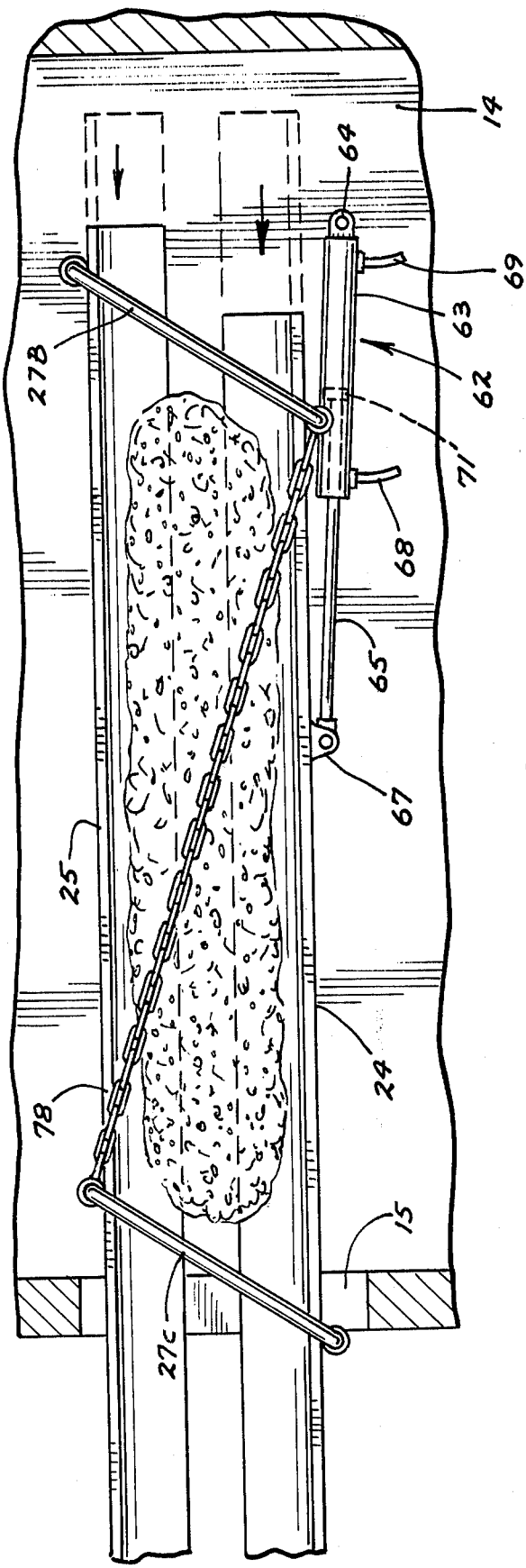

FEED CONVEYOR

SUMMARY OF THE INVENTION

Most present feed conveyors currently use some mode of transporting the feed, such as a moving chain or a belt or on flights moving along a feed bunk. A substantial variety of types of feed conveyors are available. Auger type conveyors can be dangerous, are expensive, and are noisy. Metal parts that dislodge or chip from the conveyor are apt to be consumed by feeding livestock which can result in a condition known as hardware disease. Chain and belt conveyors are likewise expensive and can have mechanical difficulties.

According to the present invention, there is provided a feed conveyor having reciprocating sidewalls to move the feed along and distribute it about a feed bunk. The conveyor has elongated substantially parallel sidewalls arranged lengthwise of and above the feed bunk. The sidewalls move toward one another to capture feed between them, then move forward to advance the feed along the bunk while holding it by friction. The sidewalls then are moved apart to release the feed and move back to the starting position. One sidewall can be driven while the other trails. The sidewalls can be laterally inclined to form a truncated V-shaped open bottom trough to advance the feed. The sidewalls are connected together by inverted U-shaped pins such that the trailing sidewall follows the driven sidewall.

BRIEF DESCRIPTION OF THE DRAWINGS

FIG. 1 is a side elevational view of a feed conveyor assembly according to the invention installed with respect to a building and a feed bunk;

FIG. 2 is a top plan view of the feed conveyor assembly of FIG. 1;

FIG. 3 is an enlarged top plan view of a portion of the feed conveyor of FIG. 1 taken along the line 3—3 thereof showing the conveyor in a retracted position;

FIG. 4 is an enlarged top plan view like that of FIG. 3, but showing the feed conveyor portion in an advanced position;

DESCRIPTION OF A PREFERRED EMBODIMENT

Figure 5:
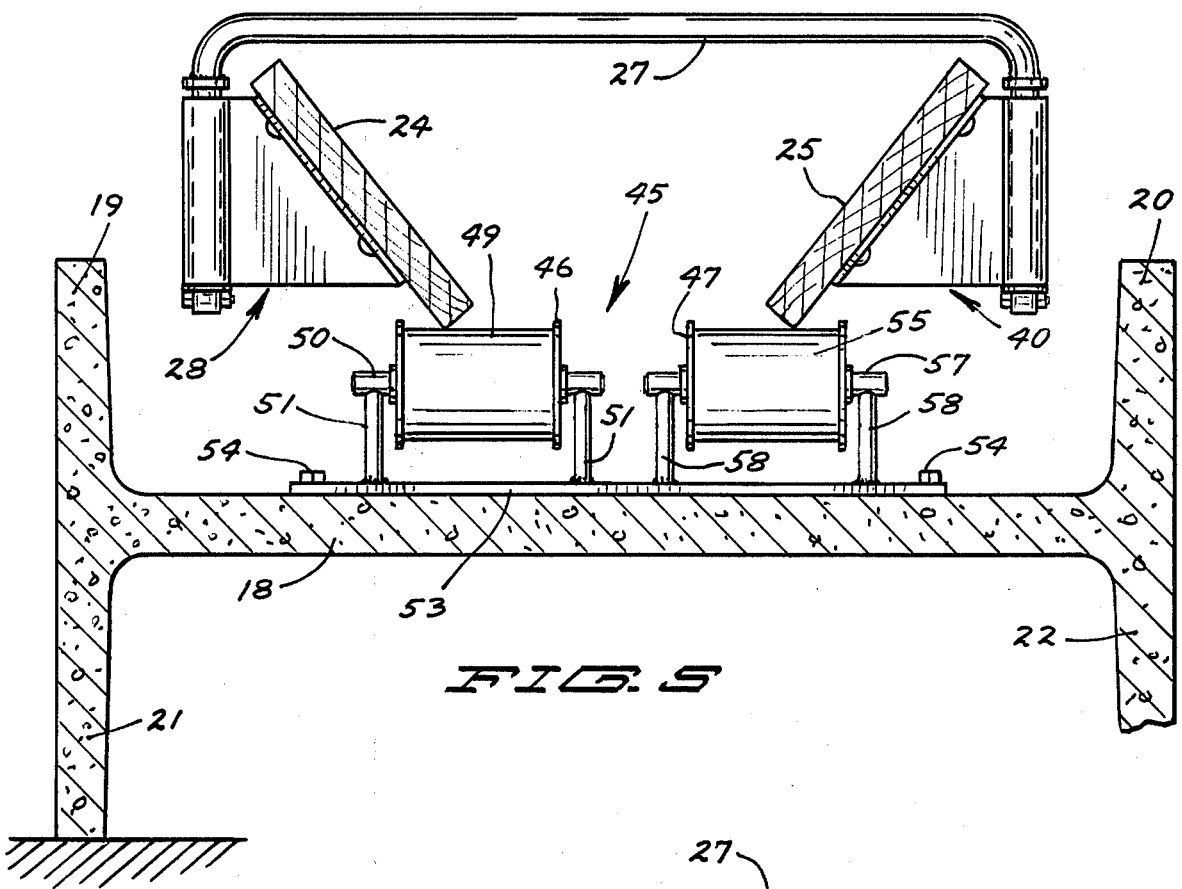
FIG. 5 is an enlarged sectional view of a portion of the feed conveyor shown in FIG. 1 taken along the line 5—5 thereof showing the feed conveyor in a retracted position.
Figure 6:
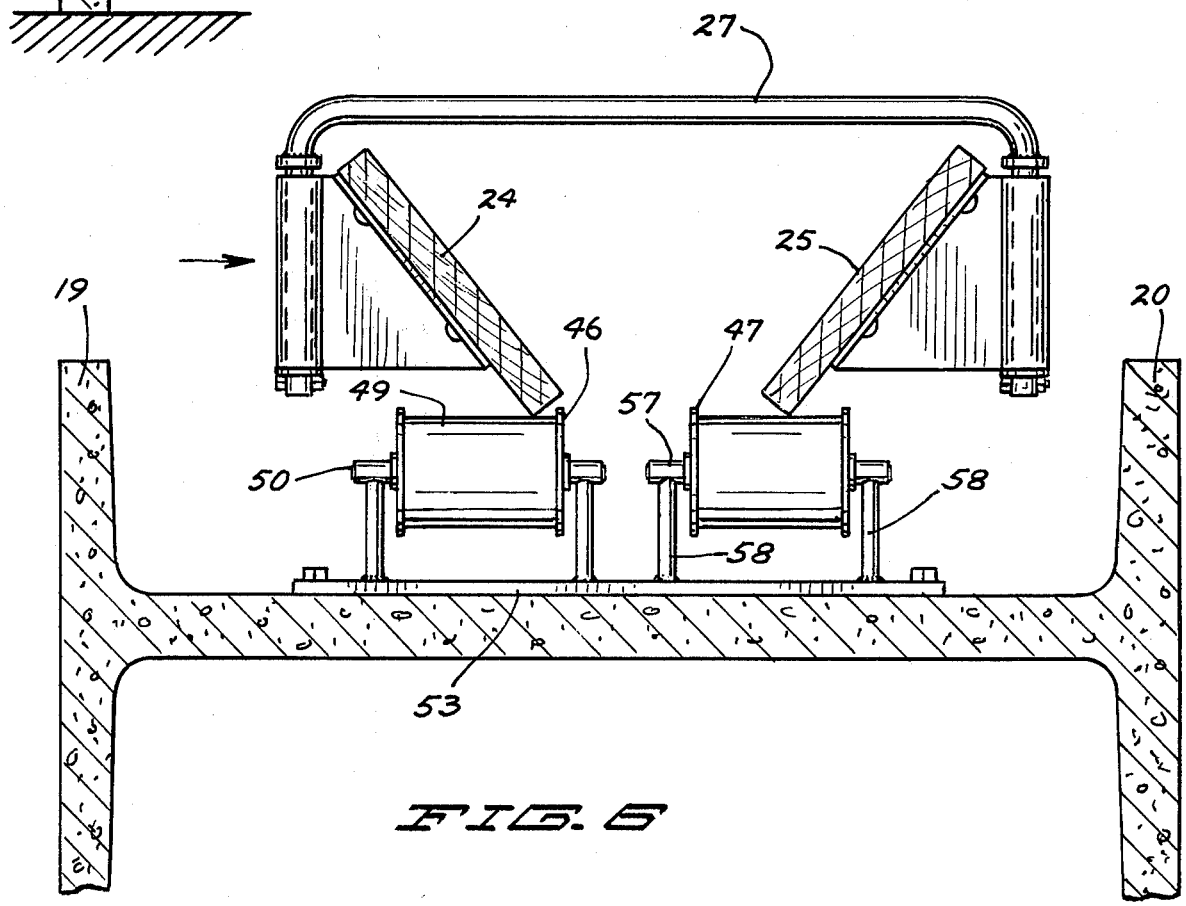
FIG. 6 is an enlarged sectional view of a portion of the feed conveyor like that of FIG. 5, but showing the feed conveyor in an advanced position.

Referring to the drawings, there is shown in FIGS. 1 and 2 a conveyor 10 mounted with respect to a building or feed shed 11 and a feed bunk 12. The rearward end or input end of conveyor 10 is located in the feed shed 11 to be charged with feed to be conveyed to feed bunk 12, and rests elevated on a platform 14. Feed located in a silo 13 is discharged through silo discharge 13A on to a chute 17 and then to conveyor 10. Conveyor 10 extends from platform 14 through an opening 15 in a sidewall 16 of feed shed 11, outward for as great a distance as is necessary to accomplish feeding purposes. Feed bunk 12 extends from a location adjacent sidewall 16 beneath opening 15 outwardly for the length of conveyor 10 to receive feed being conveyed by conveyor 10. Feed bunk 12 can be the usual concrete variety and, as shown in FIG. 5, includes a flat base 18 with upstanding side walls 19, 20 supported by continuous legs 21, 22. Base 18 is wider than conveyor 10 in order to provide room for livestock to feed.

Conveyor 10 comprises a pair of elongate, spaced apart generally parallel and longitudinally orientated sidewalls 24, 25. Sidewalls 24, 25 reciprocate inwardly and outwardly relative to one another, and forwardly and rearwardly together to advance feed held between them along feed bunk 12. The sidewalls are moved together to capture or clamp feed located between them. The sidewalls are then moved forward to move the captured feed ahead along feed bunk 12. Sidewalls 24, 25 then move apart from one another to release the feed and then move rearwardly to the originating position.

Sidewalls 24, 25 can be metal or wooden plank or other suitable material and can each be a continuous elongate member or a plurality of members suitably joined or spliced together.

Figure 7:
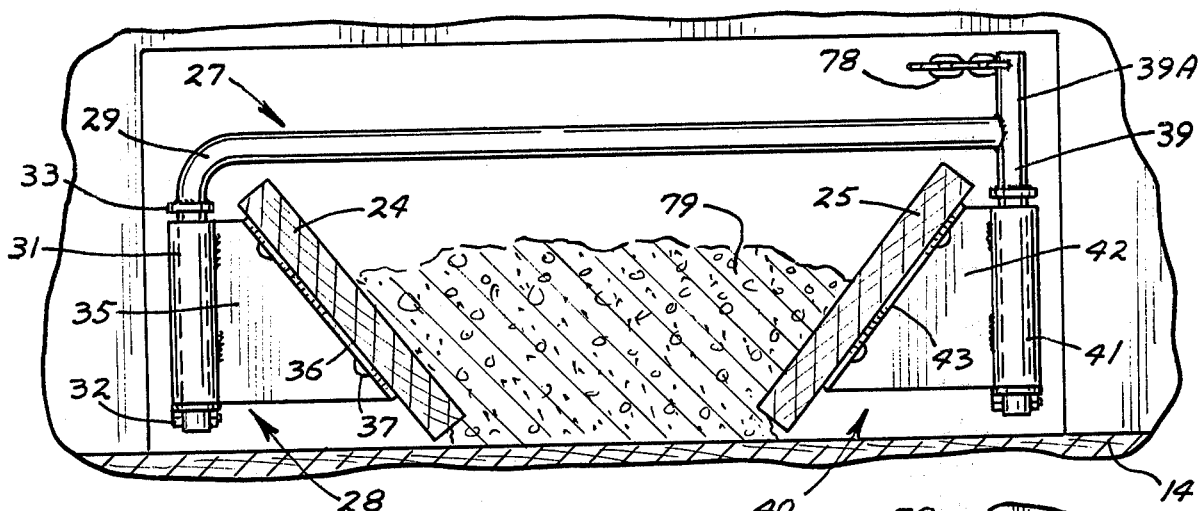
FIG. 7 is an enlarged sectional view of a portion of the feed conveyor of FIG. 1 taken along the line 7—7 thereof showing the feed conveyor in a retracted position.
Figure 8:
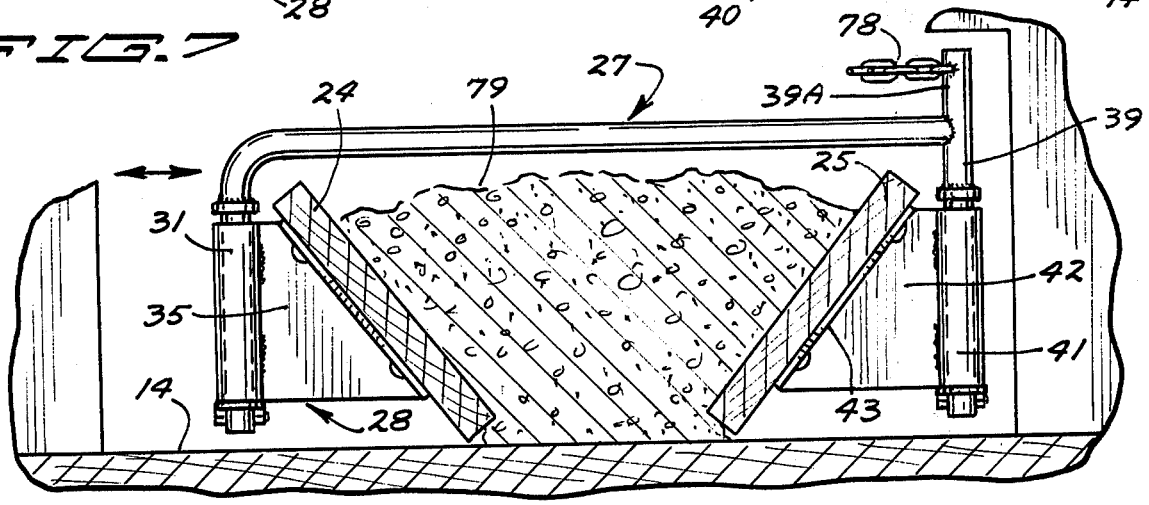
FIG. 8 is an enlarged sectional view of a portion of the feed conveyor like that of FIG. 7, but showing the feed conveyor in an advanced position.

As shown in FIGS. 5 through 8, sidewalls 24, 25 are downwardly inclined toward one another or downwardly convergent in the direction of the width to form a truncated V-shaped open bottom trough to better hold and convey feed. Sidewalls 24, 25 are connected by a plurality of spaced apart inverted U-shaped pins 27. For example, as shown in FIG. 7, a pin 27 is pivotally connected to the sidewall 24 by means of a bracket 28. A downward leg 29 of the pin 27 is pivotally engaged in a tubular sleeve 31 of bracket 28. A bolt 32 passing through the bottom of leg 29 holds the sleeve 31 thereon, and an enlarged shoulder 33 at the upper end of leg 29 inhibits upward movement of bracket 28 on leg 29. Bracket 28 has a body portion 35 connected to the sleeve 31 by welding. An inclined plate 36 is fastened to the body portion 35 to support the sidewall 24. Plate 36 is inwardly inclined and is fastened to the sidewall 24 by suitable means, such as screws 37. In like fashion, the opposite leg 39 of pin 27 is engaged in a bracket 40, as by pivotally engaging the tubular sleeve 41. The body portion 42 of bracket 40 is connected to sleeve 41 at one end and to an inclined plate 43 at the other. Inclined plate 43 supports the second sidewall 25 at the desired inclination. Sidewalls 24, 25 can be inclined 20 degrees to 30 degrees with respect to the vertical.

At the input end of conveyor 10 located in feed shed 11 the sidewalls 24, 25 ride on platform 14 wherein feed is contained between the sidewalls. Along the length of feed bunk 12, the sidewalls ride on roller assemblies so as to be positioned above the base 18 of bunk 12 to enable feed dispersal. As shown in FIG. 5, a set of roller assemblies 45 includes a first roller assembly 46 and a second roller assembly 47. The roller assembly 46 includes a roller 49 rotatably mounted, as by suitable bearing structure on a transverse horizontal axle 50 which is supported at either end by vertical arms 51. The vertical arms 51 are fixed to a flat horizontal mounting plate 53 which, in turn, is fixed to the base 18 of feed bunk 12, as by bolts 54. In like fashion, second roller assembly 47 includes a roller 55 mounted on a transverse roller axle 57 which is supported at its ends by upstanding arms 58 which are likewise secured, as by welding, to the plate 53. The lower edge of first sidewall 24 engages and rides on the roller 49 of first roller assembly 46. The lower edge of the second sidewall 25 engages and rides on the surface of the roller 55 of the second roller assembly 47. The roller assemblies permit forward and rearward movement of the sidewalls, as well as movement inward and outward. Sets of roller assemblies 45 are spaced along the length of feed bunk 12 to provide adequate support for the conveyor sidewalls 24, 25.

Figure 9:
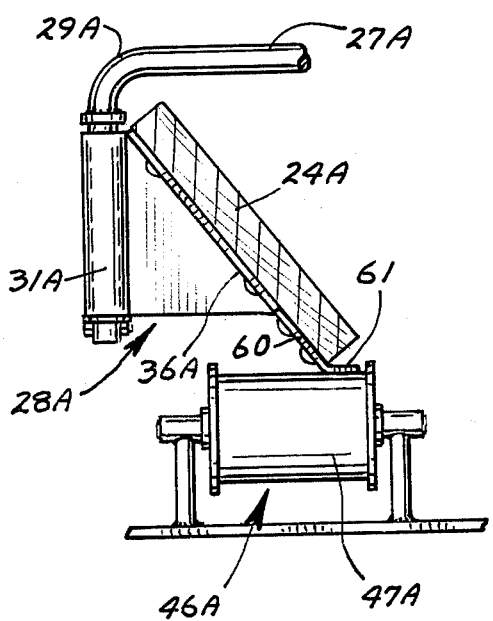
FIG. 9 shows an enlarged fragmentary view of a modification of the invention.

An alternative arrangement is shown in FIG. 9 wherein a leg 29A of a pin 27A is engaged in the sleeve 31A of a bracket 28A having an inclined plate 36A supporting a sidewall 24A. A foot 60 is fastened to the lower outside edge of the sidewall 24A and has a horizontal finger 61 extended therefrom and in engagement with the roller 47A of the roller assembly 46A. The foot 60 and finger 61 bear upon the roller to prevent wear on the lower edge of the sidewall 24A.

Power means provided for the reciprocation of sidewalls 24, 25 include a hydraulic motor assembly located in feed shed 11. As shown in FIGS. 3 and 4, the hydraulic motor assembly inludes a hydraulic motor 62 having a hydraulic cylinder 63 pivotally secured to the platform 14, as at 64, through the use of suitable means, such as a nut and bolt. A rod 65 extends forwardly out of the hydraulic cylinder 63 and is pivotally connected at its outer end to a lug 67 attached to the first sidewall 24. A first hydraulic line 68 extends into the forward end of the chamber of the hydraulic cylinder 63, and a second hydraulic line 69 communicates with the rearward end of the chamber of the hydraulic cylinder 63. Alternately supplying hydraulic fluid through the first and then through the second hydraulic lines 68, 69 is effective to cause reciprocation of a piston, indicted at 71, in the chamber of hydraulic cylinder 63. This results in reciprocation of the rod 65 and corresponding movement of the first sidewall 24 whereby the first sidewall 24 is a driven sidewall and the second sidewall 25 is a trailing sidewall.

As shown in FIG. 1, hydraulic fluid lines 68, 69 are connected to a control box 72. Control box 72 is operable through electrical switch 73. Hydraulic fluid lines 74 extend from control box 72 to a hydraulic fluid pump 75 and a hydraulic fluid reservoir 76. When energized by electrical switch 73, control box 72 is functional to cause alternate delivery of hydraulic fluid through the first and second hydraulic lines 68, 69 in known conventional fashion to reciprocate the piston 70 and thus rod 65.

As shown in FIG. 4, a length of chain 78 connects the sidewalls 24, 25 by connecting one U-shaped pin 27B with the next adjacent U-shaped pin 27C. Chain 78 connects with the pin 27B adjacent the leg extending into the bracket associated with the driven sidewall 25. The chain extends forward to the next adjacent U-shaped pin 27C and connects with it at the leg associated with the bracket 28 connecting with the trailing sidewall 25.

As shown in FIG. 7, the chain 78 can connect to an upward extension 39A of the leg 39 associated with the bracket 40 connecting the trailing sidewall 25 by suitable means, such as a nut and bolt assembly. Chain 28 provides means connecting the driven sidewall 24 with the trailing sidewall 25 to cause trailing or return movement of the trailing sidewall 25 upon rearward movement of the driven sidewall 24. Chain 78 is taut when the sidewalls are side-by-side or relatively aligned and becomes slack when the driven sidewall advances relative to the trailing sidewall.

In use of conveyor 10, feed 79 is dumped from silo 13 through silo discharge 13A to chute 17 and onto the input end of conveyor 10 between the sidewalls 24, 25 on platform 14. Conveyor 10 begins a reciprocation cycle with the sidewalls 24, 25 in a first position of generally side-by-side relationship with the widest spacing between them, the ends thereof being even as shown in phantom in FIG. 3 and in FIGS. 5 and 7. In this position, rod 65 is retracted with respect to cylinder 63. The pins 27 extend generally transverse with respect to the sidewalls. Chain 78 is taut. As rod 65 extends, the sidewalls move toward a second position, as shown in the full lines in FIG. 3 and in FIGS. 6 and 8. Driven sidewall 24 is moved ahead to an offset position. Pins 27 cause the sidewalls 24, 25 to move toward one another. Legs 29, 39 of pins 27 pivot in the respective sleeves 31, 41 of brackets 28, 40. As the sidewalls move together, they clamp upon the feed disposed between them. At the point where the feed disposed between the sidewalls prevents further inward movement toward one another, further extension of the rod 65 causes the sidewalls to move to a third position, as shown in FIG. 4. This further extension of the rod 65 causes forward longitudinal movement of both the sidwalls to the third position, at the same time moving the feed clamped between them forward. Pins 27 cause the sidewall 25 to move forward along with the driven sidewall 24. From the third position, rod 65 retracts to move the driven sidewall 24 rearward and also outward to a fourth position where the sidewalls are again in side-by-side relationship with the widest spacing between them. Chain 78 is again taut. Further retraction of rod 65 moves driven sidewall 24 back to the starting or first position. Chain 78 pulls trailing sidewall 25 along with driven sidewall 24 back to the original starting side-by-side position.

As the sidewalls 24, 25 reciprocate, they continually move feed forward. The feed is moved through the opening 15 of feed shed 11, dropping off the platform 14 into the feed bunk 12. The feed disperses in the feed bunk 12, falling through the lower spacing between the sidewalls. More feed is moved over the earlier deposited feed. The feed bunk 12 is gradually filled from the rearward end thereof to the forward end, or from the right end to the left end as shown in FIGS. 1 and 2. At the same time, livestock can be feeding from the feed bunk 12.

Conveyor 10 is of simple construction and easy to manufacture and maintain. It is inexpensive in comparison with other conveyors and it is safe and quite in operation.

While there has been shown and described one form of the invention, it will be appreciated by those skilled in the art that certain deviations and alterations can be had from the form shown and illustrated without departing from the spirit and scope of the invention.

The embodiments of the invention in which an exclusive property or privilege is claimed are defined as follows:

1. A conveyor to convey particulate material in a forward longitudinal direction, comprising:
   a first elongate sidewall and a second elongate sidewall, both generally longitudinally orientated and disposed in generally parallel spaced apart relationship to one another;

power means connected to at least one of the sidewalls operable to move the sidewalls in reciprocal fashion;

link means connecting the first and second sidewalls whereby upon operation of the power means the sidewalls move sequentially between a first spaced apart position with said sidewalls having particulate material disposed between them; inwardly to a second position wherein the sidewalls are moved toward one another to an extent that particulate matter is clamped between them; forwardly to a third position wherein the sidewalls and particulate material are moved forward; outwardly to a fourth position wherein the sidewalls are moved away from each other to unclamp the particulate material; and then rearwardly wherein the sidewalls are returned to the first position, said link means including means limiting movement of the sidewalls toward each other during rearward movement; and means supporting the sidewalls and permitting movement thereof.

2. The conveyor of claim 1 wherein:

the first sidewall is connected to the power means and is driven, and said link means connects the first and second sidewalls so that the second sidewall trails the first sidewall during movement from the second position to the third position.

3. The conveyor of claim 2 including: means positioning the first and second sidewalls at a downwardly converging inclination relative to one another to form an open bottom truncated V-shaped trough.

4. The conveyor of claim 2 wherein: the means connecting the first and second sidewalls includes a plurality of inverted U-shaped pins disposed generally transversely between the first and second sidewalls when they are in the first position, each pin having a pair of downwardly extended legs, one of said legs being pivotally connected to the first sidewall and the other of said legs being pivotally connected to the second sidewall.

5. The conveyor of claim 4 wherein: the legs of the inverted U-shaped pins are fastened to the sidewalls by a plurality of brackets, each bracket having a sleeve pivotally accommodating the lower portion of a pin leg, and each bracket having an inclined plate fastened to a sidewall, the inclined plates of the brackets orientated to hold the sidewalls in a downwardly converging inclined relationship to one another forming an open bottom truncated V-shaped trough.

6. The conveyor of claim 4 wherein: the means limiting movement of the sidewalls toward each other during rearward movement includes a flexible link connected at one end to a leg of one of said pins connected to the first sidewall and connected at the opposite end to a leg of one of said pins connected to the second sidewall at a location forward of the connection to the first sidewall, said flexible link being of a length to be taut when the first sidewall and second sidewall are in the first position.

7. The conveyor of claims 2, 4 or 5 wherein: the means supporting the sidewalls includes roller assemblies supporting at least portions of said sidewalls in engagement with the lower edges thereof.

8. The conveyor of claim 7 including: a plurality of roller assemblies disposed with respect to a supporting surface and supporting portions of the lower edges of said sidewalls, a plurality of feet fastened to the lower edges of said sidewalls at the portions thereof supported by the roller assemblies.

9. A feed conveyor to convey feed in a forward longitudinal direction with respect to a feed support surface, comprising:

a first elongate sidewall and a second elongate sidewall longitudinally orientated in spaced apart generally parallel relationship to one another to accommodate a supply of feed between them;

support means supporting the first and second sidewalls;

power means connected to the first sidewall to reciprocally move the first sidewall forwardly and rearwardly with respect to the support means and permit relative inward and outward movement of the first and second sidewalls;

linking means pivotally connecting the first and second sidewalls whereby the second sidewall is connected in trailing relationship to the first sidewall and permitting relative inward and outward movement of the first and second sidewalls, and whereby upon operation of the power means the first sidewall moves from a first position spaced apart from the second sidewall with grain disposed between the sidewalls to move forwardly and inwardly relative to the second sidewall to a second position with grain clamped between the first and second sidewalls, the first and second sidewalls then moving forwardly together to a third position advancing the grain clamped between them, then the first sidewall moving to a fourth position, outwardly and rearwardly with respect to the second sidewall, and then the first and second sidewalls moving rearwardly together to the first position, said link means including means to limit movement of the sidewalls toward one another during rearward movement.

10. The feed conveyor of claim 9 including: means positioning the first and second sidewalls at a downwardly converging inclination relative to one another to form an open bottom truncated V-shaped trough.

11. The feed conveyor of claims 9 or 10 wherein: the linking means connecting the first and second sidewalls includes a plurality of U-shaped pins disposed generally transversely between the first and second sidewalls when they are in the first position, each pin having a pair of downwardly extended legs, one of said legs being pivotally connected to the first sidewall and the other of said legs being pivotally connected to the second sidewall.

12. The feed conveyor of claim 11 wherein: the means to limit movement of the sidewalls toward one another during rearward movement includes a flexible link connecting at one end to the first sidewall and connecting at the opposite end to the second sidewall at a location forward of the connection to the first sidewall, said flexible link being of a length to be taut when the first sidewall and the second sidewall are in the first position.

13. The feed conveyor of claim 9 including: a feed bunk disposed beneath at least a forward portion of said sidewalls and means supporting the sidewalls of the feed bunk.

14. The feed conveyor of claim 13 wherein: the means supporting the sidewalls above the feed bunk include a plurality of roller assemblies mounted on the feed bunk and supporting the lower edges of the sidewalls.

15. The feed conveyor of claim 13 wherein: the rearward portions of the sidewalls are supported on a platform, the forward portions of the sidewalls being supported above said feed bunk, said power means comprising a hydraulic motor connected between the platform and the first sidewall.

16. The conveyor of claim 1 including: means positioning the first and second sidewalls at a downwardly converging inclination relative to one another to form an open bottom truncated V-shaped trough.

17. A conveyor to convey particulate material in a forward longitudinal direction, comprising:
a first elongate generally flat continuous sidewall and a second elongate generally flat continuous sidewall both generally longitudinally orientated and disposed in generally parallel spaced apart relationship to one another and positioned at a downwardly converging inclination to one another to form an open bottom truncated V-shaped trough;
power means connected to at least one of the sidewalls and link means connecting the sidewalls and operable with the power means to move the sidewalls in reciprocal fashion between a first spaced apart position with said sidewalls having particulate material disposed between them; inwardly to a second position wherein the sidewalls are moved toward one another to an extent that particulate material is clamped between them; forwardly to a third position wherein the sidewalls and particulate matter are moved forward; outwardly to a fourth position wherein the sidewalls are moved away from each other to unclamp the particulate material; and then rearwardly wherein the sidewalls are returned to the first position;
means supporting the sidewalls and permitting movement thereof; and
said link means connecting the first and second sidewalls permitting inward movement of the sidewalls a sufficient distance to clamp particulate material between them for subsequent forward movement, and including means to limit movement of the sidewalls toward one another during rearward movement, whereby movement of one sidewall under the influence of the power means results in movement of the other sidewall.

18. The conveyor of claim 17 wherein: said link means connecting the first and second sidewalls includes a plurality of inverted U-shaped pins disposed generally transversely between the first and second sidewalls when they are in the first position, each pin having a pair of downwardly extended legs, one of said legs being pivotally connected to the first sidewall and the other of said legs being pivotally connected to the second sidewall.

19. The conveyor of claim 18 wherein: the legs of the inverted U-shaped pins are fastened to the sidewalls by a plurality of brackets, each bracket having a sleeve pivotally accommodating the lower portion of a pin leg, and each bracket having an inclined plate fastened to a sidewall, the inclined plates of the brackets orientated to hold the sidewalls in a downwardly converging inclined relationship to one another forming an open bottom truncated V-shaped trough.

20. The conveyor of claim 19 wherein: the means to limit movement of the sidewalls toward one another during rearward movement includes a flexible link connected at one end to a leg of one of said pins connected to the first sidewall and connected at the opposite end to a leg of one of said pins connected to the second sidewall at a location forward of the connection to the first sidewall, said flexible link being of a length to be taut when the first sidewall and second sidewall are in the first position.

* * * * *